Nov. 6, 1956 O. R. OLSON 2,769,425
LIQUID BATH ARTICLE TREATING FURNACE
Filed Nov. 16, 1953 5 Sheets-Sheet 1
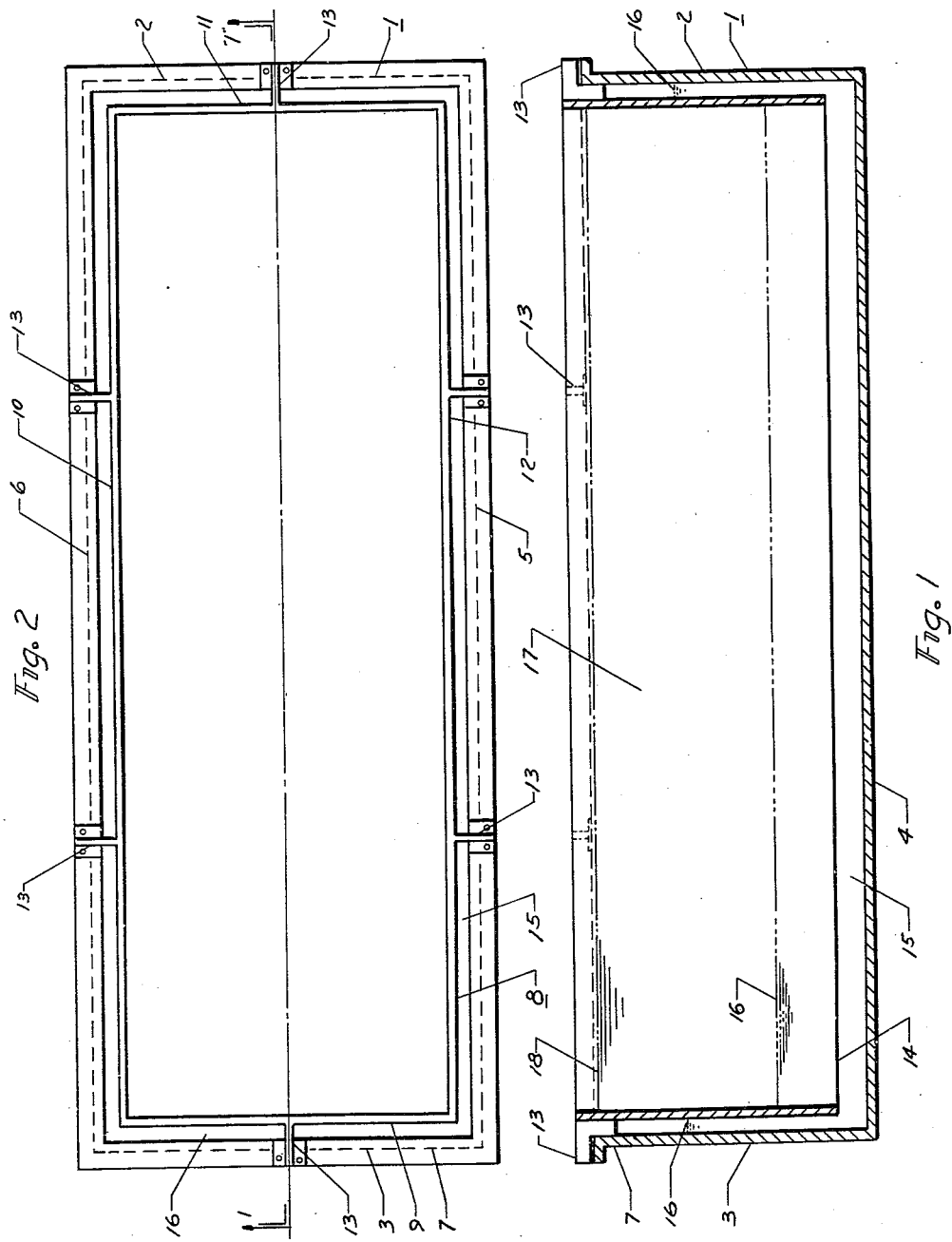
INVENTOR.
OSCAR R. OLSON
BY
HIS ATTORNEY

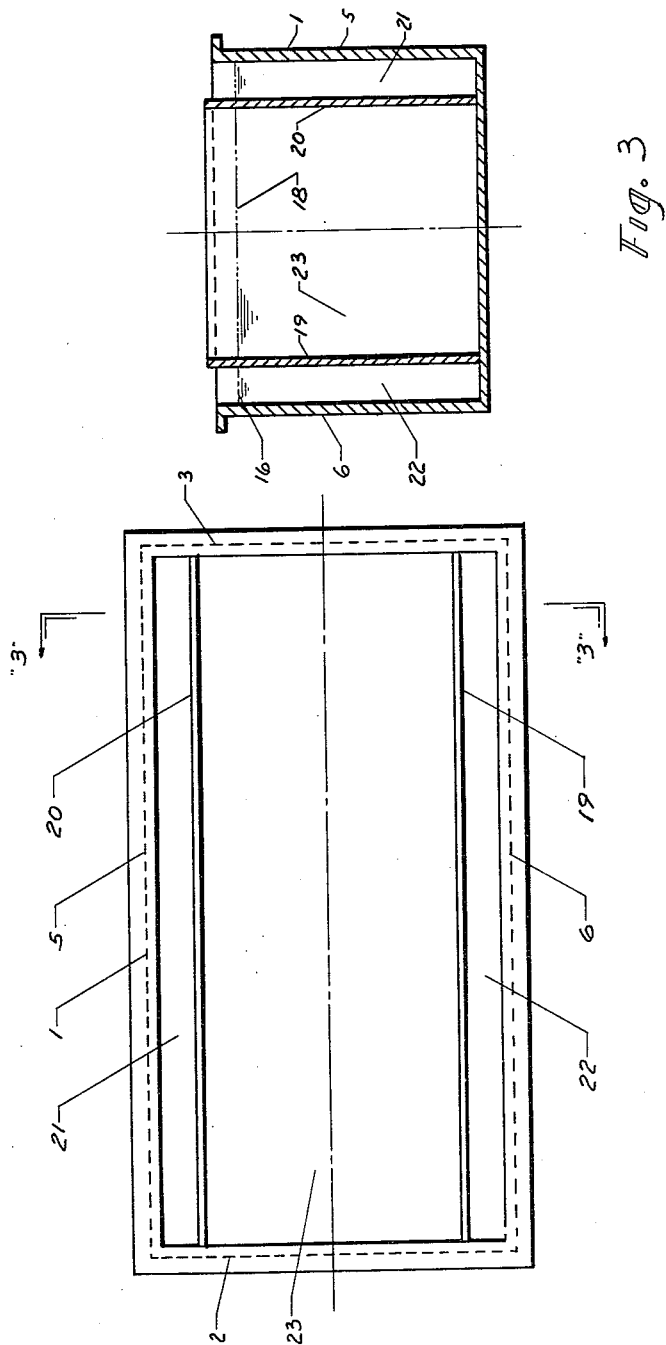

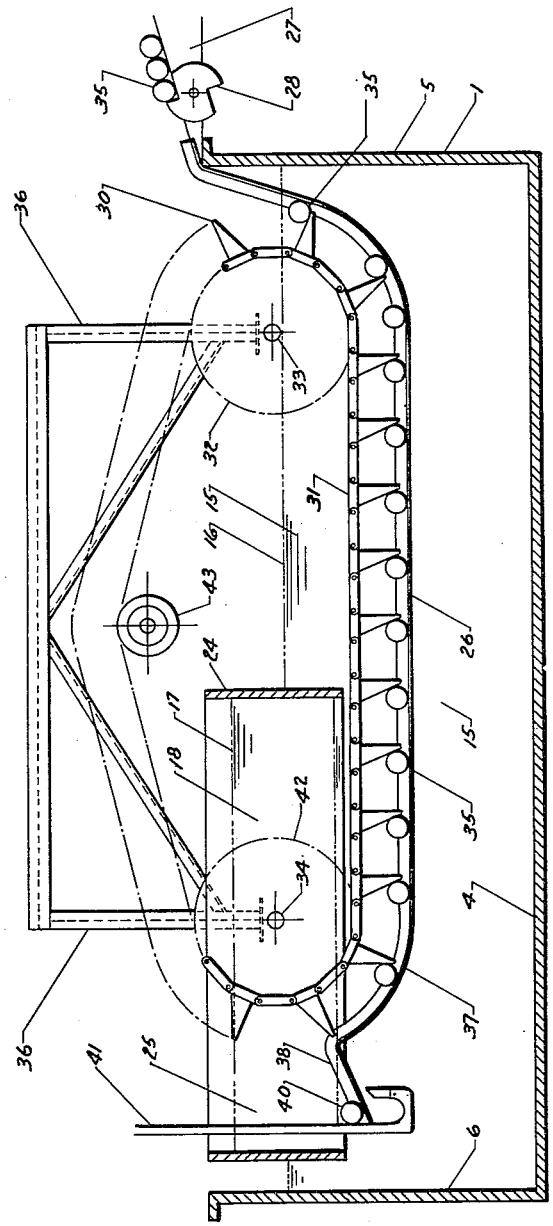

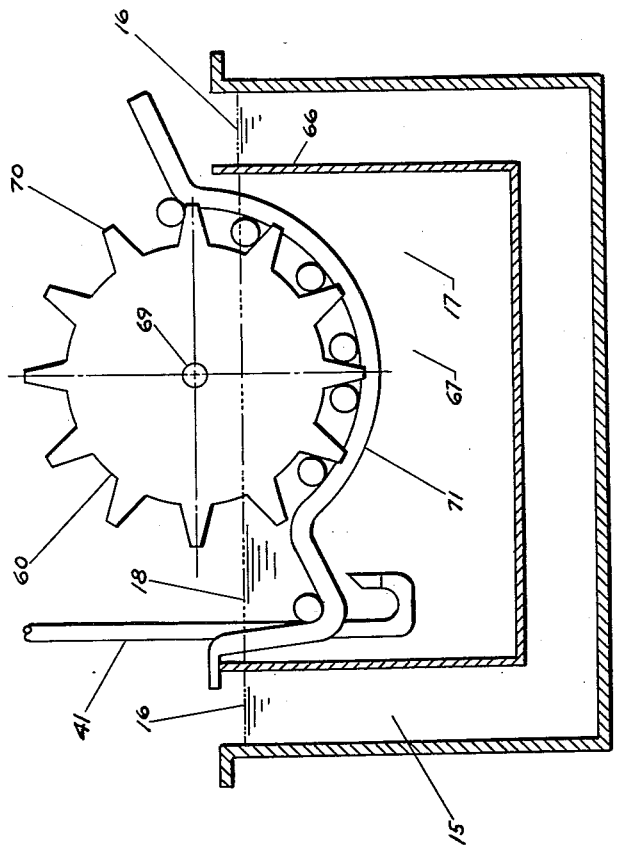

United States Patent Office 2,769,425
Patented Nov. 6, 1956

2,769,425

LIQUID BATH ARTICLE TREATING FURNACE

Oscar R. Olson, Pittsburgh, Pa.

Application November 16, 1953, Serial No. 392,204

1 Claim. (Cl. 118—429)

This invention relates generally to improvements in bath type article heating furnaces and more particularly to the improvements in the kettle type furnaces having segregated baths together with the method of treating articles therein.

The bath type article heating furnaces are generally provided with a large kettle containing a liquid bath such as a salt solution or a spelter of either lead, tin or zinc, for heat treating or coating of metals immersed within the bath in the kettle.

Bath type furnaces are ordinarily fired with oil or gas which is burned in a series of combustion chambers along the opposite sides of the kettle. These combustion chambers are arranged in a row and they are not connected together except through their flues. Each combustion chamber is required to heat a specific area of the kettle and the products of combustion withdrawn from the combustion chambers are collected in a common flue and taken to a stack. Furnaces of this character result in a nonuniform application of heat to the kettle. The kettle itself is a large steel vessel having a bottom, end and side walls which are adequately supported by a masonry structure comprising the furnace proper, however, since the kettle is heated by a series of combustion chambers on each side of the same, there are bound to be spots or areas over the face of the kettle that are heated to a higher temperature than other areas. In view of the fact that the temperature of the kettle itself varies from one spot on the surface to another, the contents of the kettle are apt to attack the metal of the furnace and cause it to erode more in the hot than on the cooler spots and the kettle will eventually erupt and discharge its contents back through the combustion chambers. In order to allow for such a happening the combustion chambers are built above the flues and the liquid flowing through the ruptured part of the kettle into the combustion chambers and out through the lower flue sections into pits which are provided below the furnace and on the outer side thereof. If the liquid is a spelter such as lead, zinc, tin, it is permitted to solidify and is then withdrawn from the pits and reclaimed.

In the kettle furnace the temperatures vary throughout the surface thereof. The most active ingredient which attacks the iron of the kettle is zinc. Lead and tin are not as active in attacking the iron of the kettle. As a matter of fact, lead is substantially inactive insofar as the iron is concerned. However, the zinc acts very freely and deteriorates and erodes the iron and combines with the iron causing the same to become ruptured. Again zinc forms one of the best coatings for articles such as iron pipe, and it is more expensive than the tin and lead, and particularly lead.

The principal object of this invention is to provide an improved bath type furnace which contains a compound liquid bath made up of a heat treating liquid and an article treating liquid bath. These combined liquid baths permit the article to be preheated before being subjected to the bath which is employed to coat the article. In view of the fact that lead weighs 708 pounds per cubic foot and zinc weighs 438 pounds per cubic foot the kettle may be filled with lead and a partition providing an open bottom may be inserted in the kettle for retaining a limited amount of zinc. Only that amount of zinc which is needed to coat the articles need be employed. This zinc may be maintained at sufficient depth according to its bead and in proportion to its weight, to properly coat the heated articles as they pass upwardly therethrough from the preheating or lead bath which is below the zinc. This can also be done with the use of tin. There will be some combining of the two liquids, however, in general, the zinc will maintain an independent bath even though it is resting upon the hot lead. This permits the use of lead for the preheating liquid. The lead being in contact with all of the walls in the bottom of the kettle, does not subject the kettle to erosive action such as that obtained by contacting the same with zinc. The lead being the heavier of the two liquids, stays in the bottom of the bath and also extends up the sides of the bath outside the partition which measures off the chamber in the bath to hold the zinc and is required to carry the zinc at a higher elevation owing to the relative weights of the two liquids. Thus the lead forms an insulation between the zinc and the kettle preventing the zinc from attacking the same. The lead bath at the same time receives the heat from the side walls of the kettle even though it is not evenly distributed, will become uniformly heated and will carry convey this heat uniformly to the zinc that is partitioned off in its independent pool in the lead bath. Thus the partition that supports the zinc bath from the lead bath is uniformly heated, and since it is uniformly heated, it is not likely to be attacked by the zinc. It takes a much longer time for a partition of this kind to be eroded sufficiently to break through and if it does break through the zinc merely spreads itself out over the entire surface of the lead bath and the same can be removed by ladling it off the surface of the bath and then replacing the partition and then replacing the zinc within the partition on the lead bath without going through the serious and troublesome steps of rebuilding the furnace owing to a fracture of the main kettle as is presently required.

Again the length of time that the article is allowed to travel at a uniform rate of speed through the lead bath permits the article to be properly heated before it is subjected to the zinc spelter. The lead itself will not in any way change the surface of the article, and as the article passes from the lead bath to the zinc bath coming upwardly therethrough, the depth of the zinc bath is made so that the speed chosen for the travel of the article through the same is sufficient to put only the proper coating of zinc on the surface thereof. In the present art, wherein zinc spelter is employed in the whole of the liquid bath and kettle, the article must rest within the bath a sufficient length of time until it is properly heated before one can be sure of receiving proper application of the zinc coating. The longer that the article stays in the zinc bath the heavier the zinc coating. Thus articles under the present practice coated with zinc by passing through a zinc spelter kettle furnace have a very thick coating of zinc on the article. The outer surface being relatively pure zinc and the coating between the outer surface and the parent steel or the parent metal of the article varies in degree with a compound made up of zinc and the metal which it coats. In other words, a combined mixture of zinc and steel will be found in the coating between the surface of the steel and the surface of the coating. This being rather thick, and not being pure zinc, is subject to cracking and breaking off when the article is bent.

Applicant's present structure and method overcomes these undesirable features in the present practice by providing a preheating of the article to the proper temperature at the time it enters the zinc bath, and the article remains in the zinc bath only long enough to provide the coating of desired thickness which is materially thinner than that of zinc spelter or zinc coated articles in that the article is preheated before it enters the zinc and in that it is permitted to stay in the zinc only a sufficient length of time to allow a thin coat to form. This thin coat is substantially of a greater percentage of the pure zinc rather than a compound of the metal on which the zinc is applied owing to the short period of time the zinc has to work on the metal. This in turn provides a better coating which clings more closely to the surface of the article and when subjected to the bending will not chip or otherwise break away. Thus one is enabled to control the character as well as the thickness of the coating by means of the present invention.

Structurally the compartment containing zinc spelter may be employed as an entirely enclosed and independent kettle within the large kettle and under these circumstances the larger kettle may employ a brine solution as the temperature conveying median to the zinc tank.

The preferred way of making this independent bath for the zinc on the lead bath is to provide a partition which is spaced from the walls in the main kettle and extends thereabove. This partition may be supported from the kettle or may be supported by girders from outside the furnace as it is preferable to have the zinc bath higher than the lead bath to permit the lead bath to cover the whole of the inside of the kettle. Since zinc is much lighter than the lead it is therefore necessary to have the same at a higher elevation. The partitioned wall may be supported within the lead bath and may be a completely annular wall. However, it may be connected or even welded to the side walls of the kettle in which case the partition walls could extend the full length of the kettle being attached to the ends and allowing the lead bath to be between the partition and the side walls and underneath the zinc bath. If the zinc kettle is entirely independent of the heat transferring bath, then of course the materials cannot be preheated in the heat transferring bath without being first exposed to air before inserted into the zinc bath. If however, the zinc bath is enclosed by a partition that is open at the bottom, to the lead bath, the zinc bath is floated on top of the lead bath, then the articles may be traveled through the lead bath to preheat the same and continue to travel upwardly through the zinc bath where they are properly coated by the zinc before being discharged. This type of heat treating bath furnace thus requires only a very small portion of zinc and the size of the partition limits the size of the zinc bath which is a more precious metal than lead and prevents the same from attacking the main kettle as it does not come in contact with the main kettle walls and it is not as active on the partition as the partition wall is uniformly heated by the lead bath. In the event that the partition is attacked and destroyed, this failure does not disrupt the operation of the furnace as the zinc merely spreads over the surface thereof and may be reclaimed without taking the furnace out of operation. It is not difficult to lift the partition out of the furnace and replace it by a new one and reladle the zinc from the surface of the lead into its own compartment with very little time loss in production.

The zinc compartments may be secured to the end walls of the kettle and thus partition off the side walls which lie against the combustion chambers. This provides a very long and wide zinc bath. If the zinc bath need not be so large, the partition may be removable and replaceable as previously stated.

Other objects and advantages appear hereinafter in the following description and claims.

The accompanying drawings show for the purpose of exemplification without limiting the invention or claims thereto, certain practical embodiments illustrating the principles of the invention wherein:

Fig. 1 is a sectional view of a furnace containing a partition wall which is uniformly spaced in the kettle wall and is removable therefrom.

Fig. 2 is a plan view of Fig. 1.

Fig. 3 is a view in vertical section of a kettle having integral partitions along the side walls thereof.

Fig. 4 is a plan view of the structure shown in Fig. 3.

Fig. 5 is a vertical sectional view of a ketlte having an independent zinc bath and an automatic unit for feeding the articles through a lead preheating bath and an independent zinc bath floated on the lead.

Fig. 7 is a sectional view showing a kettle holding a lead bath and an independent kettle with a zinc bath suspended in the lead bath.

Figure 6:
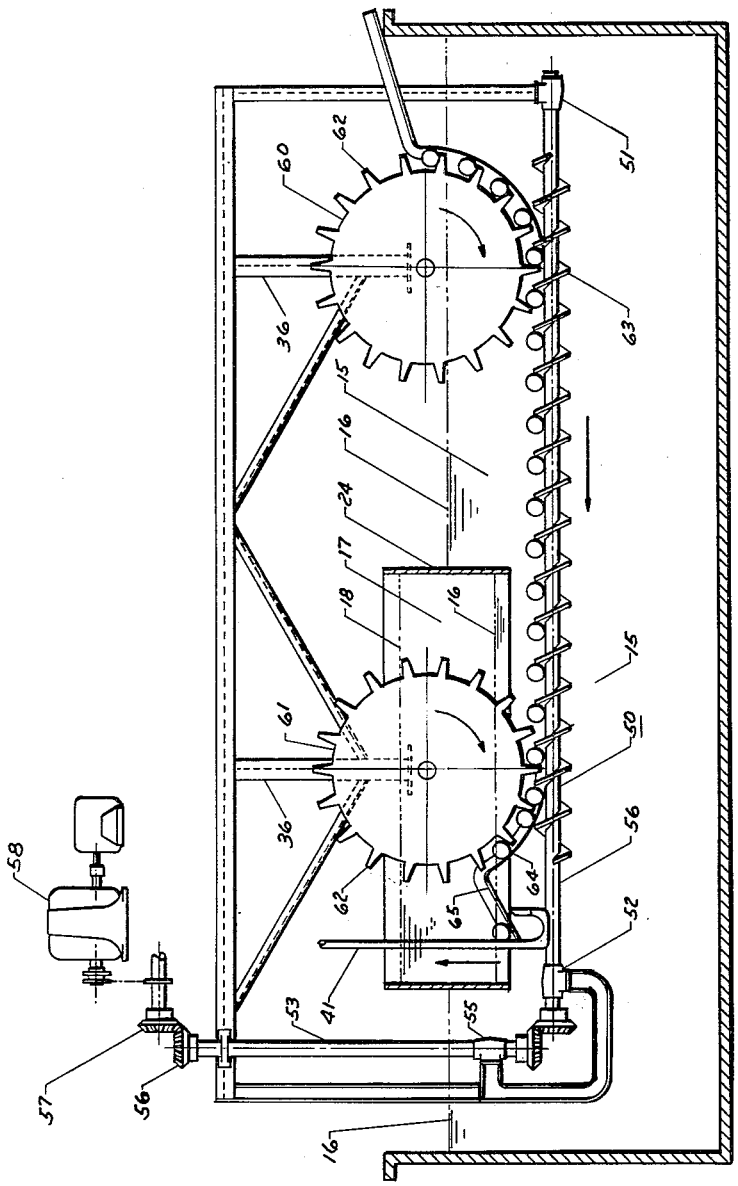
Fig. 6 is a view similar to Fig. 5 showing a different type of feeding appliance for moving articles through a compound bath of lead and zinc.

Referring to the drawings, and in particular Figs. 1 and 2, the kettle 1 is in the form of a tank having the end walls 2, 3, the bottom 4, and the side walls 5 and 6 all formed integral with each other to produce an open top tank. The end and side walls have the outwardly extending flange 7.

Suspended within the tank is the chamber forming partition wall 8 which has four sides 9, 10, 11 and 12 corresponding to the end and side walls of the kettle 1. This partition wall has bridging members 13 which extend over the flange 7 to support the partitioned wall with its lower edge 14 spaced from the bottom 4 of the kettle. These bridge members are bolted to the flange 7 and extend therebelow to space and center the partition wall. When positioned in the tank the partition wall forms a second chamber 8 and when the kettle is placed within the furnace combustion chambers disposed along the sides of the kettle which is characteristic of the majority of kettle furnaces, a predetermined amount of lead, which is indicated at 15, is first poured into the kettle 1. Melted zinc is then added to the chamber 8 and displaces the lead to fill the chamber 8. The lead will rise in the space between the sides of the kettle until it reaches the position such as indicated at 16. When the zinc, which is indicated at 17, is poured on the top of the lead it is not allowed to reach the bottom of the partition. The zinc displaces the lead in proportion to its weight and the height of the column 16 of lead, which surrounds the outer side of the partition 8, is such that it is displaced by the height and weight of the volume of the zinc 17 within the partition. Since the zinc is much lighter than the lead the level 18 of the zinc bath is somewhat higher than the level of the lead bath, however, the volume or the space around the partition and the height of the partition together with the space enclosed by the partition are proportioned so that the levels of these liquids of different weight will be properly proportioned and will stand in the proper elevation in the tank when in use. If the tin spelter is employed in place of the zinc, of course the proportions have to be changed owing to the fact that the weight of tin is a lighter one than lead but not as light as zinc. When the furnace is operated the heat is supplied to the lead 15 which in turn uniformly heats the partition wall. No hot spots will develop on the wall which subjects the same to attack by the zinc.

Referring to Figs. 3 and 4 the tank 1 is provided with longitudinally disposed partition walls 19 and 20 which extend the full length of the kettle 1 and are formed integral with the kettle end walls and bottom preventing any connection between the lead which is within the chambers 21 and 22 formed between the partition walls and the side walls 5 and 6. Here the partitions enclosing the lead in the chambers 21 and 22 merely isolate the central pool 23 which contains the zinc. The lead functions as a heat transfer agent for maintaining the proper temperature of the zinc in the chamber 23. The lead produces a uniform heat distribution along the partition walls 19 and 20 and with the aid of uniform heating of the walls the zinc is not apt to attack the same. Since the lead and zinc chambers are independent of each other the surfaces of these liquids may be at the same elevation.

Referring now to Fig. 5 it will be seen that the tank 1 is provided with the annular partition wall 24 which is spaced from the side walls 5 and 6 and the end walls 2 and 3 of the kettle 1, however, the partition wall 24 which is provided with four sides is open at the bottom allowing the zinc to float on top of the lead and confining the size of the zinc compartment 25. A plurality of skids 26 are suspended within the kettle 1 and the skid 27 feeds the articles to be coated to the indexing device in the form of the notched wheel 28. This wheel is employed to feed the articles in turn into the several pockets between the spaced abutments 30 of the chain 31. The wheel 32 carrying the chain 31 is journaled on a removable frame 36 suspended into the kettle 1 but is not supported by the kettle 1. The frame 36 carries the shafts 33 and 34. The shaft 33, although suspended in the tank 1, is not immersed whereas the perimeter of the wheel 32 is immersed in the lead and the pockets carrying the articles 35 immerses them into the lead path 15 where they are preheated as they are carried along by the chain 31. The abutments 30 shove the articles along the skids 26 until the skids rise at the opposite end of the tank as indicated at 37 where the articles 35 are permitted to roll over the discharge skid 38 into the pocket 40 of the elevator or extractor 41. The time that it takes the elevator or extractor to rise through the zinc bath 17 is sufficient to coat the article 35 with zinc as the articles have been preheated in the lead and as soon as they rise into the zinc bath, they take on the zinc coating very rapidly and are then discharged. The chain 31 passes around the wheel 42 and over the takeup roller 43 which is likewise supported on the frame 36. The frame 36 may or may not carry the partition wall 24. If the frame 36 carries the partition wall 24, and it is desired to remove the feeding mechanism, the pool 17 of zinc is ladled from the partition enclosure before the whole mechanism is withdrawn from the kettle 1.

In Fig. 6 the structure is similar insofar as the independent zinc pool and the kettle are concerned, however, a different type of driving mechanism is provided. Here the chain 31 is replaced by means of the screw feed device 50 which is supported in bearings 51 and 52 suspended from the frame 36 and a vertical shaft 53 carried by the bearings 54 and 55. The ends of the shaft 53 are provided with beveled gears. The lower beveled gear connects with a mating beveled gear on the shaft 56 to drive the same, and the upper beveled gear meshes with the beveled gear 57 on the motor driven speed reducer 58.

The wheels 60 and 61 are mounted on shafts and are provided with tooth members 62 which are engaged and driven by the worm section 63 on the shaft 56 through the articles being conveyed. Thus the worm section 63 and the teeth 62 on the wheels 60 and 61 function not only to carry the articles through the lead bath 15, but also serve to drive the wheels 60 and 61 through the articles.

When the articles reach the skid 64 they are moved upwardly and out of the lead bath into the zinc bath 17 and they are discharged over the discharge skid 65 onto the elevator 41 that carries the article up through the zinc bath and resposes therein a sufficient length of time to properly coat the article. The time for coating the articles of course is materially less than that of normal procedure owing to the fact that the article has been brought up to temperature by means of passing the same through the lead bath and they are sufficiently hot to quickly assume a zinc coating of the proper thickness.

Referring now to Fig. 7, the kettle 1 has suspended therein the smaller kettle 66 which provides an independent chamber 67 for containing the zinc bath 17. The kettle 1 contains a lead bath 15 and since the chambers are independent from each other, the levels 16 and 18 of the lead and zinc respectively, may be at the same elevation. A conveyor wheel 68 carried by the rotary shaft 69 has teeth 70 that form pockets in which the articles are conveyed around the skids 71 suspended in the small zinc tank 66. Thus we have a zinc kettle supported in suspension within a lead bath. This kettle 66 must be bolted down to prevent its floating even though filled with a zinc bath, and carrying one or more conveyor wheels. This structure is similar to that shown in Fig. 1 with a bottom placed on the partition wall.

It is to be understood that the invention disclosed herein is not limited in its application to the details and construction and arrangement of parts illustrated in the accompanying drawings since the invention is capable of other embodiments and of being practiced or carried out in various ways.

I claim:

A kettle structure for a bath type heating furnace comprising an outer kettle having bottom and side and end walls defining a chamber to contain heated liquid, an inner structure in said kettle having side and end walls spaced respectively from the corresponding walls of said outer kettle and defining an inner enclosure for retaining heated liquid separated from said outer chamber, a plurality of bridge members secured to the outer side of said inner wall in spaced relation to each other, each bridge member in the form of a right angle bracket having a wide horizontal leg section and a wide vertical leg section both of which stand vertically in a single plane medial to the plane of said enclosure wall to which it is attached, the width of each of the vertical leg sections correspond to to the desired spacing of the inner wall from the corresponding outer kettle wall and each of said horizontal leg sections bearing on said kettle rim to hold said inner wall raised above said kettle rim.

References Cited in the file of this patent

UNITED STATES PATENTS

| | | |
|---|---|---|
| 2,062,795 | Pike | Dec. 1, 1936 |
| 2,127,180 | Mandell | Aug. 16, 1938 |
| 2,345,058 | Matteson | Mar. 28, 1944 |
| 2,428,523 | Marshall | Oct. 7, 1947 |
| 2,430,474 | Marshall | Nov. 11, 1947 |

FOREIGN PATENTS

| | | |
|---|---|---|
| 767,384 | France | July 17, 1934 |
| 518,350 | Great Britain | Feb. 23, 1940 |